United States Patent [19]
Paterson et al.

[11] Patent Number: 4,789,117
[45] Date of Patent: Dec. 6, 1988

[54] BODIES WITH REDUCED BASE DRAG

[75] Inventors: Robert W. Paterson, Simsbury; Michael J. Werle, West Hartford, both of Conn.; Walter M. Presz, Jr., Wilbraham, Mass.

[73] Assignee: United Technologies Corporation, Hartford, Conn.

[21] Appl. No.: 947,164

[22] Filed: Dec. 29, 1986

[51] Int. Cl.⁴ .............................................. B64C 1/38
[52] U.S. Cl. .............................. 244/130; 296/180.1; 296/180.4
[58] Field of Search ................ 244/130, 200; 296/1 S; 105/1.1, 1.2

[56] References Cited

U.S. PATENT DOCUMENTS

| | | | |
|---|---|---|---|
| 1,366,635 | 1/1921 | Conway . | |
| 2,074,201 | 3/1937 | Bechereau | 244/91 |
| 2,238,749 | 4/1941 | Peltier | 170/159 |
| 2,962,101 | 11/1960 | Vaghi | 170/159 |
| 3,072,368 | 1/1963 | Seddon et al. | 244/41 |
| 3,434,425 | 3/1969 | Critcher | 102/92.1 |
| 3,481,531 | 12/1969 | MacArthur et al. | 230/134 |
| 3,776,363 | 12/1973 | Kuethe | 181/33 |
| 3,873,048 | 3/1975 | Platou | 244/3.1 |
| 4,343,506 | 8/1982 | Saltzman . | |

FOREIGN PATENT DOCUMENTS

| | | | |
|---|---|---|---|
| 452986 | 11/1948 | Canada | 244/200 |
| 822352 | 11/1951 | Fed. Rep. of Germany | 244/130 |
| 845900 | 8/1952 | Fed. Rep. of Germany | 244/200 |
| 794841 | 2/1936 | France | 244/200 |
| 454600 | 1/1950 | Italy . | |
| 791563 | 3/1955 | United Kingdom . | |

OTHER PUBLICATIONS

"Axisymmetric Bluff Body Drag Reduction Through Geometrical Modification", by Howard and Doodman, *Journal of Aircraft*, vol. 22, #6, 6/85.

"Longitudinal Grooves for Bluff Body Drag Reduction", by Howard, Quass, Weinstein and Bushnell, AIAA Technical Note 81-4095, vol. 19, No. 4, Apr. 1981.

*Primary Examiner*—Galen Barefoot
*Assistant Examiner*—Rodney Corl
*Attorney, Agent, or Firm*—Stephen E. Revis

[57] ABSTRACT

A body adapted to move downstream through a fluid has a downstream extending smooth surface terminating at a blunt base. A plurality of adjacent U-shaped, downstream extending troughs in the smooth surface intersect the blunt base to form trough outlets. The troughs are appropriately spaced apart, sized and configured to flow full over their entire length and cause fluid to flow into the space immediately behind the blunt base, thereby reducing base drag on the body.

38 Claims, 7 Drawing Sheets

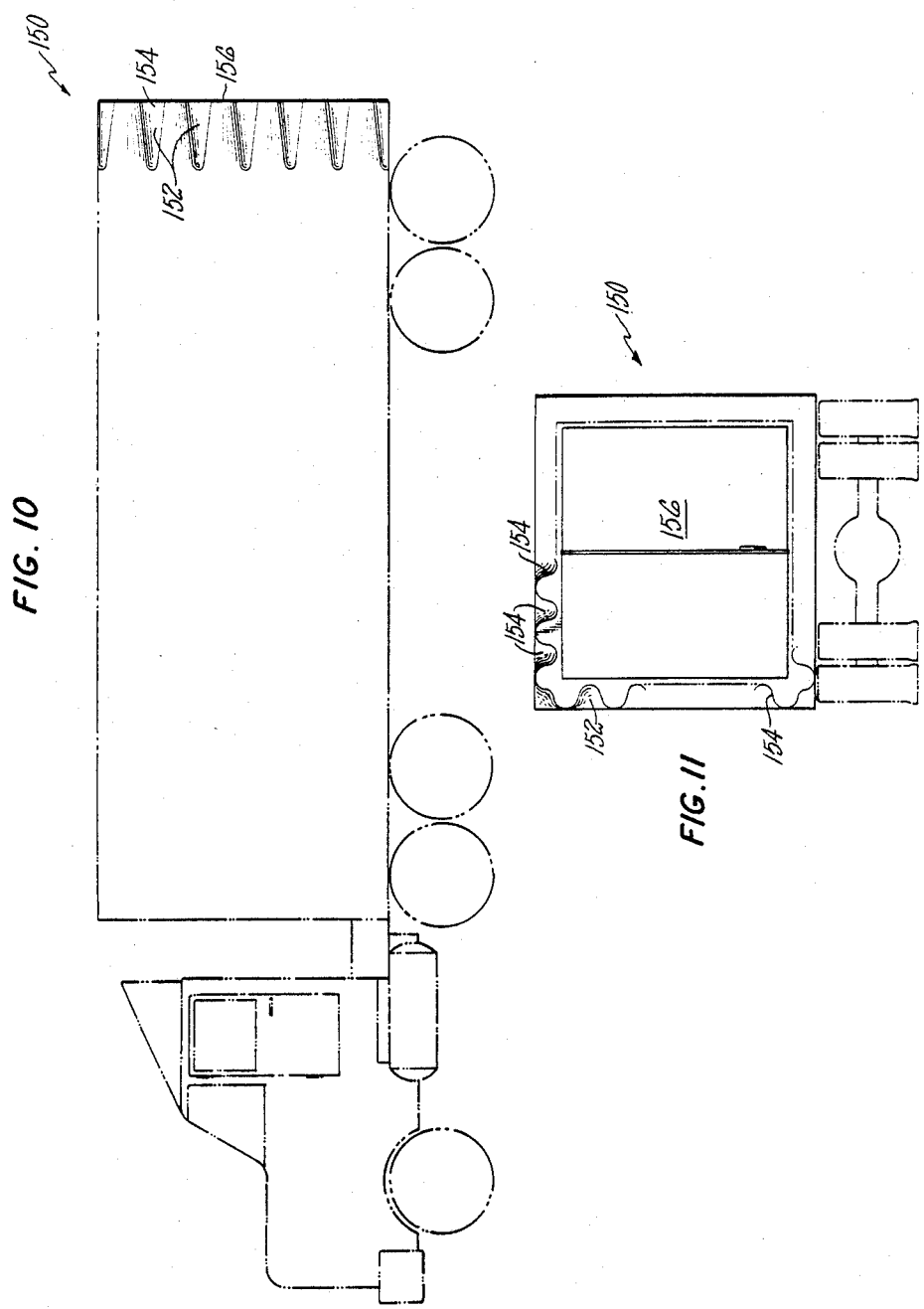

BODIES WITH REDUCED BASE DRAG

TECHNICAL FIELD

The present invention relates to reducing base drag.

BACKGROUND ART

Drag is the result of skin friction and surface pressure variations induced by viscous effects, especially those due to separation bubbles or regions (i.e., low pressure wakes). Separation regions occur when two and three dimensional boundary layers depart from the surface of the body. Bluff or blunt bodies have shapes which tend to promote a rapidly increasing downstream pressure gradient in the streamline flow around it which can cause the bulk flow to break loose from the surface of the body. This is particularly true for bodies having blunt end surfaces, such as automobiles, tractor trailors, and blunt ended projectiles. The separation bubbles created behind these objects as they move through the air produce high base drag.

Airfoil shaped bodies such as airplane wings, rudders, sails, and gas turbine engine rotor blades and stator vanes have a streamlined shape which, at moderate angles of attack (below about 15°) avoid streamwise two-dimensional boundary layer separation over the entire surface. At higher angles of attack (or increased loading) separation does occur and a recirculating flow region (or a low pressure wake) is formed, greatly increasing drag and reducing lift. As used in the specification and appended claims, "streamwise, two-dimensional boundary layer separation" means the breaking loose of the bulk fluid from the surface of a body, resulting in a flow near the wall moving in a direction opposite the bulk fluid flow direction.

It has been a constant goal of aerodynamicists to reduce the drag and improve lift and stall characteristics (if appropriate) on bodies disposed in a fluid moving relative thereto. A common way to avoid boundary layer separation on an airfoil (or other streamlined body) or to at least delay separation such that it occurs as far downstream along the surface of the airfoil as possible so as to minimize drag, is to reduce the pressure rise downstream such as by tailoring the surface contour along the length of the airfoil in the direction of bulk fluid flow.

Another well known method for reducing the drag on airfoils is to create turbulence in the boundary layer so as to impart a greater average momentum of the boundary layer fluid, which carries it further downstream along the surface against an adverse pressure gradient, thereby delaying the separation point. For example, U.S. Pat. No. 4,455,045 to Wheeler describes elongated, expanding channels in the flow surface. The channels have sharp, lengthwise edges. The boundary layer on the surface flows into the channels, and the channel edges create streamwise vortices below the level of the normal flow surface which energize the flow in the channel to maintain boundary layer attachment of the flow along the floor of the channel.

Similarly, Stephens creates a plurality of adjacent streamwise extending channels in the flow surface. The channels continuously expand laterally from a narrow inlet to a wide outlet. A generally triangular ramp is formed between adjacent channels. Stephens explains that the boundary layer flow is split between the ramps and the channels. The flow within the channels spreads out and the boundary layer becomes thinner and remains attached to the surface longer. The ramp flow is diverted into the general flow. One application (FIG. 6 of Stephens) is between the roof and rear window of an automobile to maintain the flow attached to the curved surface for a greater distance than normal.

In U.S. Pat. No. 1,773,280 to Scott, increased lift without increased drag is created for an aircraft wing by placing a plurality of side-by-side chordwise extending ridges along the top of the wing from its leading to its trailing edge, the ridges having their highest point near the thickest portion of the wing. The ridges themselves are airfoil shaped when viewed from above, tapering to a point at the trailing edge of the wing. This concept does not take into account viscous induced boundary layer separation effects and therefore could not be expected to avoid separation at high lift conditions.

U.S. Pat. No. 3,588,005 to Rethorst uses chordwise extending ridges in the upper surface of an airfoil to delay the onset of separation by providing "channels of accelerated flow in the free stream flow direction to add energy to the boundary layer and maintain laminar flow in the region of normally adverse pressure gradient". The ridges protrude from the surface "to a height of the order of the boundary layer thickness". Cross flow components "are accelerated over the ridges and may reduce the likelihood of separation near the aft end . . . of the body by allowing the flow to 'corkscrew' smoothly off the aft end rather than encounter the abrupt adverse pressure gradient in the free stream direction caused by a blunted aft end". As with the ridges of the Scott patent discussed above, flow is also accelerated between the ridges which further helps maintain laminar flow over the airfoil surface.

U.S. Pat. Nos. 3,741,235 and 3,578,264 to Kuethe delay separation by creating vortices using a series of crests or concave depressions which extend substantially transverse to the streamwise flow direction. Kuethe states that the maximum height of a crest or depth of a depression is preferably less than the boundary layer thickness.

In a paper titled "The Reduction of Drag by Corrugating Trailing Edges" by D. L. Whitehead, M. Kodz, and P. M. Hield published by Cambridge University, England in 1982, blunt case drag of a blade (having a 20-inch span, 20-inch chord length, a constant thickness of 1.5 inches and a blunt trailing edge) is reduced by forming the last seven inches of its chordwise length into streamwise extending, alternating troughs and ridges (corrugations). The trailing edge and any upstream cross-section across the corrugations has the shape of a sine wave with an 8.0 inch wavelength. The thickness of the blade material is maintained constant over the length of each trough and ridge, although the trough depth or ridge height (i.e., wave amplitude) transitions from a maximum of 2.0 inches at the trailing edge to zero upstream. The total trough outlet area is more than 50% of the blunt base area. FIGS. 21-23 show the blade described therein, with dimensions given in terms of a unit length "a". A reduction of base drag of about one-third was realized when compared with a reference blade without corrugation. It is explained that spanwise vortices which were shed alternately from the top and bottom rear edges of the non-corrugated reference blade were eliminated by the corrugations.

In general, it is believed that the separation delaying devices of the prior art create significant drag in their own right, thereby negating some of the benefits they would otherwise provide. This sometimes limits their effectiveness. While many of the devices of the prior art have proved to be effective in reducing drag, further improvement is still desired, such as with respect to reducing base drag on blunt based objects.

DISCLOSURE OF THE INVENTION

One object of the present invention is to reduce the drag on blunt ended bodies.

Another object of the present invention is to reduce the size of the separation bubble downstream of a blunt ended body.

According to the present invention, an article adapted to be disposed in a fluid stream moving downstream relative thereto has a generally streamwise extending surface which terminates as a blunt, generally downstream facing end surface, wherein a plurality of troughs are disposed in the streamwise extending surface and extend to the blunt end surface in the direction of the near bulk fluid flow forming trough outlets in the end surface, the troughs being constructed and designed to flow full and to cause the fluid flowing therefrom to move into the space immediately behind the blunt end surface to reduce size of the separation bubble which would otherwise be formed. In other words, the present invention reduces the intensity of the low pressure wake formed immediately behind a blunt end surface.

In this application the blunt end surface of an article may be either a downstream facing end surface formed by a rapidly increasing rate of curvature of a generally streamwise extending surface, or the downstream facing end surface at which a streamwise extending surface terminates abruptly, such as when the end surface is essentially perpendicular to the streamwise surface. The troughs of the present invention must be contoured and sloped such that they flow full (i.e., no streamwise, two-dimensional boundary layer separation occurs within the troughs). Thus, the troughs must extend from a point upstream of where boundary layer separation would normally occur. The troughs are preferably U-shaped in cross section taken perpendicular to the downstream direction and are preferably smoothly curved (i.e., no sharp angles where trough sidewall surfaces meet the trough floor) to minimize losses. Most preferably the troughs form a smoothly undulating surface which is wave-shaped in cross section perpendicular to the downstream direction.

Commonly owned U.S. patent application Ser. No. 857,907 filed on Apr. 30, 1986 titled *Airfoil Shaped Body*, by Walter M. Presz, Jr. et al (hereinafter the '907 application) describes an airfoil trailing edge region with streamwise troughs and ridges formed therein defining a wave-like, thin trailing edge. The troughs in one surface define the ridges in the opposing surface. The troughs and the ridges help delay or prevent the catastrophic effects of two-dimensional boundary layer separation on the airfoil suction surface, by providing three-dimensional relief for the low momentum boundary layer flow. The present invention, however, is directed to reducing the base drag created behind a blunt based article. One distinction between the '907 application and the present invention is that in the present invention the troughs need only be formed in one surface. Additionally, the troughs can have a significant effect even when the blunt end surface area is much greater than the sum of the trough outlet areas, even twenty times greater or more.

It is believed that the fluid leaves the troughs with a direction of momentum that carries it over the blunt end surface into the normally stagnant region behind the blunt end surface (i.e., a downwash is created). Additionally, it is believed that each trough generates a single, large-scale axial vortex from each side wall surface at the trough outlet. (By "large-scale" it is meant the vortices have a diameter about the size of the overall trough depth.) These two vortices rotate in opposite directions and create a flow field which tends to cause fluid from the trough and also from the nearby bulk fluid to move into the region behind the blunt surface. The net effect of this phenomenon either alone or coupled with the downwash effect, is to reduce the size of the stagnation bubble normally formed behind a blunt end surface, thereby reducing base drag. Additionally, in cases where the shedding of spanwise vortices is an additional contributor to base drag, it is believed that the troughs suppress such shedding.

Adjacent troughs should be spaced far enough apart such that the counter-rotating axial vortices tending to be generated from the sidewall surfaces of adjacent troughs have enough space to become fully developed. If the troughs are too close together the counter-rotating vortices will interfere with each other or cancel each other out.

According to another aspect of the present invention, it is preferred that the fluid exit from each trough with the least possible lateral component of velocity to minimize secondary flow losses. For this reason the trough sidewalls, for a significant distance upstream of the outlet, are preferably parallel to the direction of bulk fluid flow adjacent the surface in the vicinity of the trough.

In accordance with another aspect of the present invention, it is preferred that the trough sidewalls at the outlet be steep, most preferably substantially perpendicular to the streamwise extending surface. This is believed to increase the intensity of the vortex generated by the sidewall. The word "steep" as used herein and in the claims means that, in cross section perpendicular to the direction of trough length, lines tangent to the steepest point on each sidewall intersect to form an included angle of no more than about 120°.

The present invention is particularly suitable for use on bodies having oppositely facing, downstream or streamwise extending surfaces which are joined by a blunt, downstream facing end surface substantially perpendicular to the flow direction. In that instance a plurality of downstream extending troughs may be formed in both oppositely facing surfaces, with the trough outlets in the blunt end surface. Whether or not troughs are formed in one or both surfaces, the troughs should have a depth at their outlets and be of sufficient cross-sectional flow area relative to the total surface area of the blunt end surface to have a not insignificant effect on the separation bubble which would normally be formed. A minimum trough outlet depth of only a few percent of the distance between the oppositely facing surfaces at the trough outlets can be effective. The troughs in each surface may have a corresponding trough directly opposite it in the other surface (i.e., a symmetrical trough outlet pattern); or, the trough outlets may be staggered, alternating from side to side along the transverse length of the end surface (i.e., a non-symmetrical trough outlet pattern). The troughs in opposing surfaces each create a flow of fluid across the blunt end surface toward the opposite side. If the opposite surfaces are close enough to each other for the flows from the troughs to interact, the non-symmetrical pattern is believed to be preferred since the alternating regions of upwash and downwash may reinforce each other.

The foregoing and other objects, features and advantages of the present invention will become more apparent in the light of the following detailed description of preferred embodiments thereof as illustrated in the accompanying drawing.

BRIEF DESCRIPTION OF THE DRAWINGS

FIG. 10 is a side elevation view of a tractor trailer which incorporates the present invention.

FIG. 11 is an end view of the tractor trailer taken generally in the direction of the line 11—11 of FIG. 10.

BEST MODE FOR CARRYING OUT THE INVENTION

Figure 1:
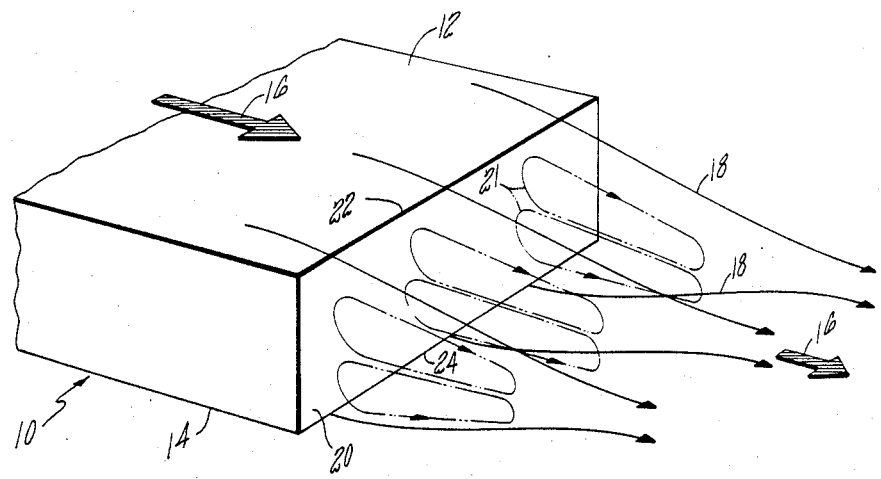
FIG. 1 illustrates the fluid dynamics associated with a blunt based body moving relative to a fluid stream.

FIG. 1 illustrates what occurs when fluid flows over the surface of a body which terminates at a blunt downstream end. In this figure the body is represented by the reference numeral 10, and includes upper and lower smooth, flat surfaces 12, 14, respectively, over which fluid is flowing. The wide arrows 16 represent the downstream direction, while the lines 18 represent streamlines of the bulk fluid flowing adjacent the surfaces 12, 14. As is well known in the art, although the fluid may stay attached to the smooth surfaces 12, 14 under a wide range of conditions, it cannot turn the corner when it reaches the blunt end surface 20, resulting in separation at or near the upper and lower edges 22, 24. The flow off the upper and lower surfaces rejoin each other at some point downstream of the surface 20. Upstream of that point there is a low pressure region 21 (or "separation bubble") between the upper and lower streamlines immediately downstream of the blunt end surface 20. If the fluid flow is the result of the body 10 moving through the fluid in an upstream direction, this low pressure stagnation region results in a force in the downstream direction which resists or is opposite to any force attempting to move the body in the upstream direction. This force is referred to as the base drag, and can be substantial.

Figure 2:
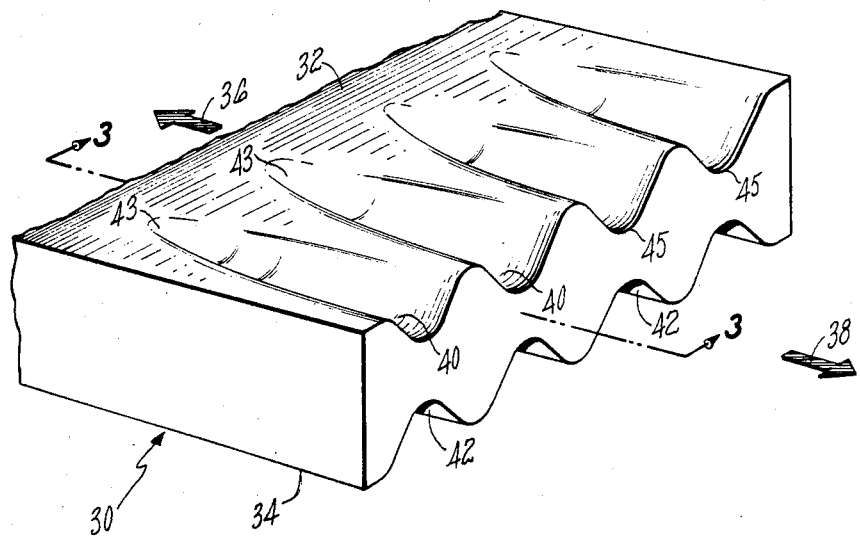
FIG. 2 is a perspective view of a blunt based article incorporating the features of the present invention.
Figure 3:
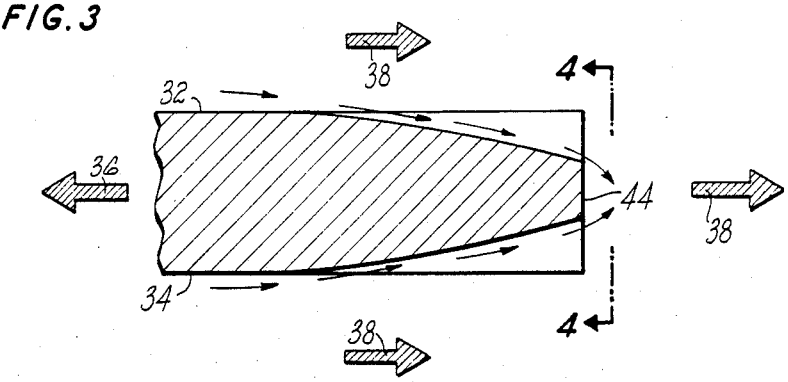
FIG. 3 is a sectional view taken along the line 3—3 of FIG. 2.

The present invention reduces base drag while introducing minimal other losses which counteract the benefits of reduced base drag. The invention is illustratively shown and described with reference to FIGS. 2-6. As shown in FIG. 2, an article incorporating the present invention is generally represented by the numeral 30. The article has an upper surface 32 and a lower surface 34. It is assumed that the article is moving through a fluid, such as air, in an upstream direction generally represented by the arrow 36. The downstream direction is represented by the arrow 38. According to the present invention a plurality of downstream extending troughs 40 are formed in the upper surface 32; and a plurality of downstream extending troughs 42 are formed in the lower surface 34. The troughs are generally U-shaped in cross section taken perpendicular to the downstream direction. Each trough extends from its respective inlet 43 to a blunt end surface 44 which joins the upper and lower surfaces 32, 34 and faces substantially downstream.

Figure 6:
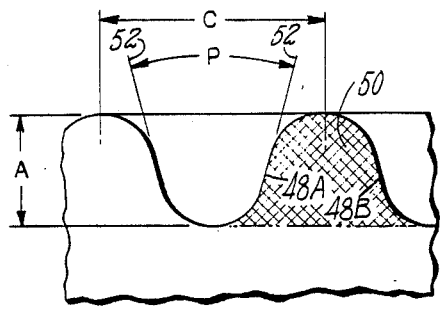
FIG. 6 is an enlarged view of the area designated Y in FIG. 4.

The troughs must be contoured, sized and shaped to flow full over their entire length such that streamwise boundary layer separation does not occur within the troughs. In this regard, the fluid flowing along the surfaces 32, 34 must be attached to such surfaces (i.e., no streamwise boundary layer separation) as it enters the trough inlets. The trough outlets 45 in the end surface 44 have an amplitude or depth A (FIG. 6). They have zero depth at their upstream ends and blend smoothly into their respective upper and lower surfaces at their upstream ends and along their length. In this preferred embodiment each trough increases in depth from its upstream end to its outlet. However, this is not required. For example, the depth could reach a maximum upstream of the trough outlet and then remain constant to the outlet.

Figure 5:
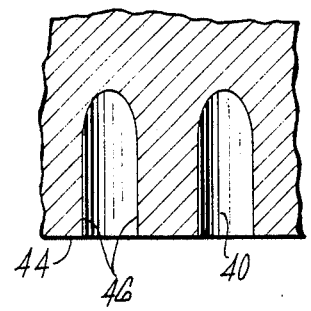
FIG. 5 is a sectional view taken generally in the direction of the line 5—5 of FIG. 4.

In this exemplary embodiment the troughs are smoothly U-shaped along their length in cross section perpendicular to the downstream direction and define a smoothly undulating surface which is wave shaped in cross section perpendicular to the downstream direction. Each trough has a pair of facing sidewall surfaces 46 which terminate as side edges 48 of the trough outlet 45. Preferably the sidewall surfaces 46 are substantially parallel to the direction of bulk fluid flow over the surface in which they are disposed over a substantial continuous portion of the length of the trough, which includes the trough outlet. The parallel nature of the sidewall surfaces 48 is best shown in FIG. 5. It is undesirable that the sidewalls diverge since it contributes to streamwise separation within the troughs and introduces lateral velocity components in the fluid leaving the trough, which create undesirable secondary flow losses.

It is believed that a couple of different fluid dynamic mechanisms are responsible for the reduced base drag resulting from the present invention, although these mechanisms are not fully understood. It is felt, for example, that there is a bulk motion of the fluid leaving the troughs which motion is into the space immediately behind and adjacent the blunt end surface as if it were, to some extent, remaining attached to the blunt end surface of the article after it exits the troughs. Second, it is believed that each trough generates a pair of large-scale axial vortices, the axial direction being the downstream direction. Each vortex is generated off of a respective one of the two trough side edges 48. The vortices of each pair rotate in opposite directions. These vortices create a flow field which tends to cause fluid from the trough and from the nearby bulk fluid to move into the region behind and adjacent the blunt surface.

In order that the vortex generated off of the side edge 48 of one outlet is not interfered with (i.e., cancelled out) by a counterrotating vortex generated off the side edge of the next adjacent trough it is necessary that the side edges of adjacent troughs be spaced apart by a sufficient distance. Thus, it is necessary that a portion of the area of the blunt end surface 44 extend laterally from the side edge 48 of each trough outlet to the side edge 48 of an adjacent trough outlet over the full length of each of the side edges. This area of the blunt end surface is represented by the cross hatched area 50 of FIG. 6 disposed between the trough side edges designated by the reference numerals 48A and 48B. In general, the downstream projection of the area 50 between the side edges of adjacent troughs should be at least about one-fourth (¼) of the downstream projected outlet area of a trough.

It is further believed that best results are obtained when the side wall surfaces 48 at the outlet are steep. Preferably, in a cross section perpendicular to the downstream direction, which is the direction of trough length, lines 52 tangent to the steepest points along the side edges 48 should form an included angle C (FIG. 6) of no greater than about 120°. The closer angle C is to zero degrees (0°), the better.

The troughs should be large enough in downstream projected cross-sectional area at their outlets, relative to the total downstream projected area of the blunt end surface to have a worthwhile impact on the base drag. For some applications a total trough outlet area which is only a few percent of the total blunt base area may produce a measureable reduction in base drag. For most applications a trough outlet area no more than 30% of the total blunt base area would be used due to practical considerations.

It is also believed that the troughs should not be too narrow relative to their depth, otherwise appropriate flow patterns within the trough will not develop and the desired base drag reduction will not occur. With reference to FIG. 6, the trough width at its outlet is considered to be the peak to peak wave length P, and the trough depth at the outlet is considered to be the peak to peak wave amplitude A. The ratio P/A should be greater than about 0.25 and preferably at least 0.5. Additionally, the ratio P/A should be less than about 4.0.

The results will also not be very effective if the trough is too long relative to its outlet depth (amplitude) since the appropriate flow fields generated within the trough will dampen out before reaching the outlet. It is believed that the ratio of trough length to outlet amplitude should be no greater than about 12 to 1.0.

Figure 12:
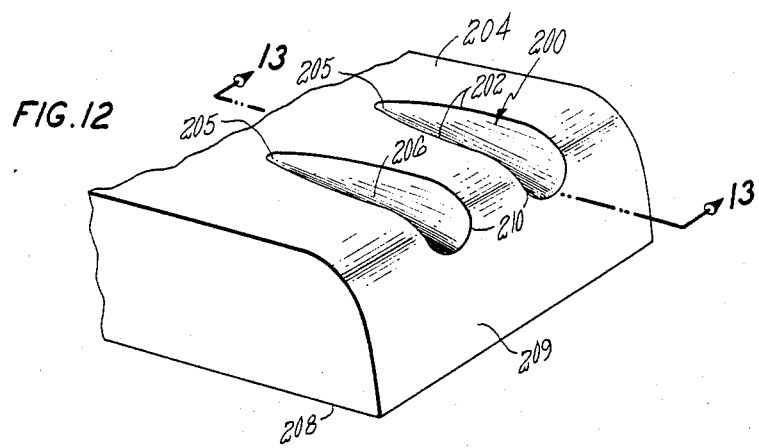
FIG. 12 is a partial perspective view of a blunt ended body which incorporates another embodiment of the present invention.
Figure 13:
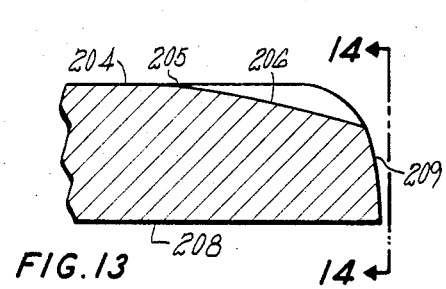
FIG. 13 is a sectional view taken along the line 13—13 of FIG. 12.
Figure 14:
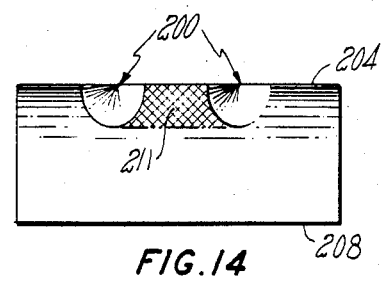
FIG. 14 is an end view taken in the direction of the line 14—14 of FIG. 13.

Although in the embodiment of FIGS. 2-6 the end surface 44 is flat and perpendicular to the downstream direction, the invention may be applied to blunt ends of other shapes (see FIGS. 12-14).

Figure 7:
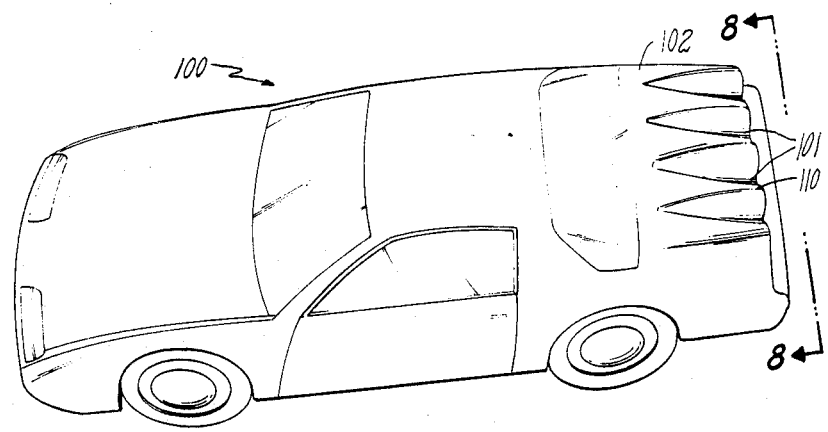
FIG. 7 is a perspective view of an automobile which incorporates the present invention.
Figure 8:
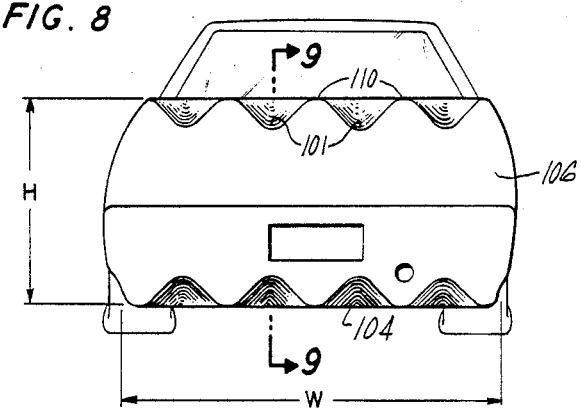
FIG. 8 is an end view of the automobile taken generally in the direction of the line 8—8 of FIG. 7.
Figure 9:
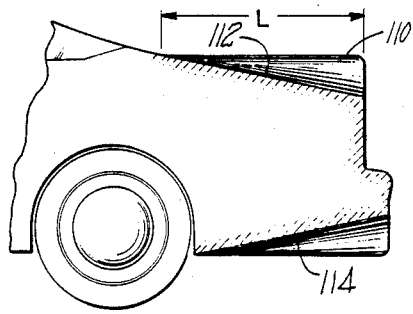
FIG. 9 is a partial sectional view taken along the line 9—9 of FIG. 8.

In FIGS. 7-9 a trough configuration similar to that shown in FIGS. 2-6 is incorporated in the rear end of an automobile generally represented by the reference numeral 100. The troughs 101 are formed in the upper trunk surface 102 and in the under surface 104 of the vehicle. The troughs intersect the rearwardly facing blunt end surface 106. One distinction between the embodiment of FIGS. 7-9 and the embodiment of FIGS. 2-6 is that the troughs 101 are formed by adding lobes 110 to the original vehicle contours represented by the lines 112 and 114.

As a test, a 1/25th scale model of a Pontiac Firebird Trans-Am was purchased and troughs were formed on the trunk lid surface and on the under surface of the car by adding material as opposed to cutting away material. This resulted in adding additional blunt base area to the automobile. The floor or bottom of each trough followed approximately the contour of the original surface of the vehicle. Referring to FIGS. 8 and 9, the overall dimensions of the blunt end surface were H=1.4 inches and W=2.9 inches. The length L of the troughs was 1.4 inches. The troughs formed a smoothly undulating surface which was wave shaped in cross section taken perpendicular to the downstream direction. The wave had a period of 0.6 inches and a peak to peak amplitude of 0.3 inches. The angle corresponding to the angle C of FIG. 6 was 90°. The surfaces 112, 114 each formed an angle of only about 12° with a horizontal plane.

In a wind tunnel test at a velocity of 75 ft/sec the modified model incorporating the present invention had an overall drag 16 percent less than the overall drag on the model prior to modification, despite an approximately 12.5 percent increase in the base surface area. Since only the rear end of the vehicle was modified, it can be assumed that the overall drag reduction was essentially due to reduced base drag.

FIGS. 10 and 11 show the present invention applied to a trailer truck generally designated by the reference numeral 150. As shown, troughs 152 are formed as depressions in the normally flat side surfaces and the top and bottom surfaces of the trailer. The trough outlets 154 are in the plane of the blunt rear end surface 156 and form a smooth wave shape along the four edges of the end surface 156. Although formed as depressions, the troughs could equally well have been formed by adding material to the trailer surfaces as was done to the automobile 100 shown in FIGS. 7-9.

Another embodiment of the present invention is illustrated in FIGS. 12-14. Note that there are troughs 200 only in one surface. Also, the troughs 200 are semicircular in cross section at all points along their length and form relatively sharp edges 202 with the smooth, flat surface 204 in which they are disposed. Although sharp edges are not preferred since they induce losses, it is believed that a significant net benefit may stil be obtained with such a configuration. As best seen in FIG.

13, the bottom surface 206 of each trough blends smoothly with the surface 204 at the upstream end 205 of the trough and has its outlet 210 in the curved blunt end surface 209. The outlets 210 are located upstream of where boundary layer separation from the surface 204 would normally occur (i.e., without troughs). As discussed with respect to the embodiment of FIGS. 2-6, the downstream projection of the blunt surface area portion 211 (shaded) disposed laterally between each pair of adjacent troughs should have an area which is at least one quarter (¼) of the downstream projected area of a trough outlet.

Figure 15:
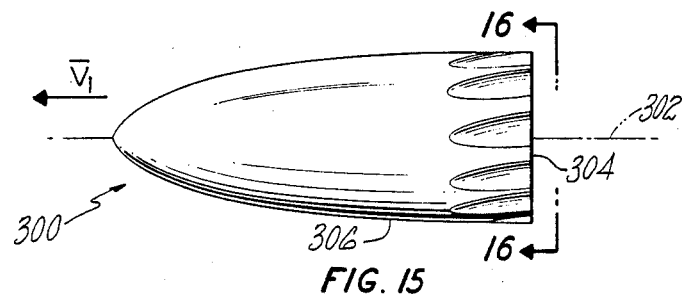
FIG. 15 is a side elevation view of a projectile incorporating the present invention.
Figure 16:
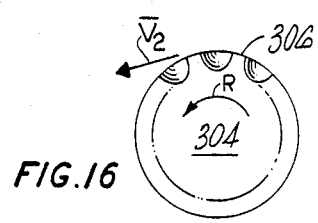
FIG. 16 is an end view of the projectile of FIG. 15 taken generally in the direction of the line 16—16 of FIG. 15.

The trough configuration of the present invention may also be used to reduce the base drag of a projectile, such as the ballistic shell 300 shown in FIGS. 15 and 16. Projectiles of this type typically rotate in flight about their longitudinal axis, such as the axis 302 of the shell 300, for purposes of aerodynamic stability. The direction of rotation is represented by the arrow R. The shell 300 has an axial velocity V represented by the vector $\overline{V}_1$. The vector $\overline{V}_2$, which is tangent to the shell surface 306, represents the rotational velocity of the shell external surface 306 at the shell downstream end 304. Each trough extends generally parallel to the direction of the sum of the vectors $\overline{V}_1$ and $\overline{V}_2$. This trough orientation is required in order that the fluid flows into the troughs in a direction substantially parallel to the trough length.

Figure 4:
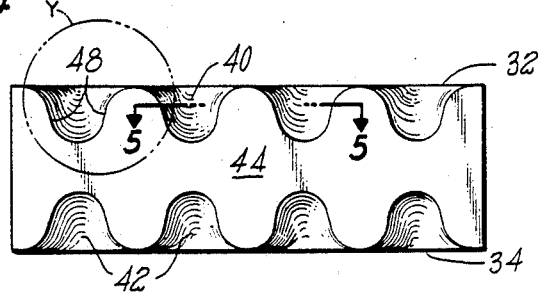
FIG. 4 is a view taken generally in the direction of the line 4—4 of FIG. 3.

Although troughs of generally semicircular cross section (like those described with respect to FIGS. 12-14) are shown in this embodiment, the troughs could also be configured as shown in the embodiment of FIGS. 4-6 (i.e., U-shaped troughs formed by a smoothly undulating surface, wave-shaped in cross section perpendicular to the downstream direction).

Figure 17:
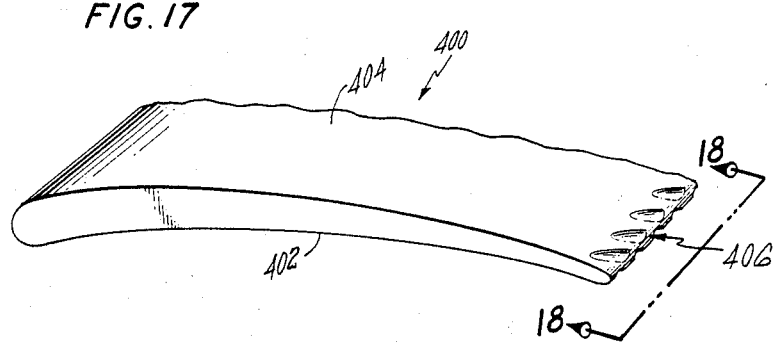
FIG. 17 is a partial perspective view of an airfoil which incorporates the present invention in its trailing edge.
Figure 18:
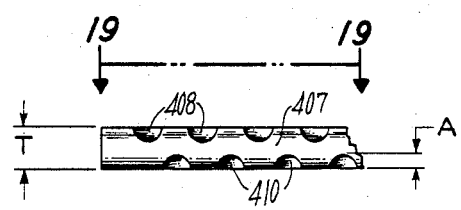
FIG. 18 is a view taken generally in the direction 18—18 of FIG. 17.
Figure 19:
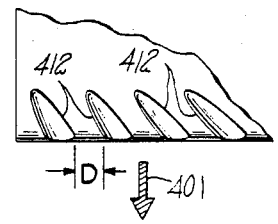
FIG. 19 is a view taken generally in the direction of the line 19—19 of FIG. 18.

The present invention may also be applied to the thin trailing edge of an airfoil, such as the gas turbine engine compressor rotor blade shown in FIGS. 17-19. The airfoil is generally represented by the reference numeral 400. The direction of the engine axis is represented by the arrow 401 in FIG. 19, which is the downstream direction. The airfoil 400 has a pressure surface 402 and a suction surface 404 which converge toward each other to form a thin trailing edge 406. Although an airfoil thin trailing edge is not normally considered to be "blunt", it is believed that fluid boundary layers which remain attached to the pressure and suction surfaces even down to the very end of the airfoil ultimately separate from the trailing edge 406 in a manner which creates a narrow, but not negligible, separation region immediately downstream of and adjacent the trailing edge. Therefore, for purposes of this embodiment, the end surface 407 is considered to be a blunt end surface.

In this embodiment the troughs of the present invention are shown cut into (i.e., formed) in both the suction surface 404 (troughs 408) and the pressure surface 402 (troughs 410); however, troughs in only one of those surfacesis also contemplated as being within the scope of the present invention. If there are troughs in both the pressure and suction surfaces, the outlets of the troughs in one surface are preferably laterally offset from the troughs in the other surface (i.e. a non-symmetrical trough pattern). The depth of the troughs at their outlet should not exceed about 50% of the trailing edge thickness T.

Each trough extends in a direction approximately parallel to the direction of the bulk fluid flow streamlines in its vicinity adjacent the surface in which the trough is disposed. The object is to have the troughs oriented such that fluid flows into each trough essentially parallel to the direction of trough length. Due to blade rotation, the local bulk fluid flow direction adjacent the blade surface varies along the blade length. Thus the trough orientation will vary along the blade length as does the radial component of the fluid velocity. The selected orientation will generally be based upon cruise conditions to maximize benefits.

In this embodiment the planes of both the pressure and suction surfaces extend to the surface 407 between the edges 412 of adjacent troughs. As explained with respect to other embodiments of the present invention, the lateral distance D between adjacent trough outlets in each surface should be selected to assure thatthe downstream projected area of the blunt end surface 407 disposed laterally between the outlet edges of adjacent troughs in each surface is at least about one-fourth (¼) of the outlet area of one of the troughs. The other teachings concerning trough contour and size taught in conjunction with the other embodiments of the present invention are also applicable to this embodiment.

Figure 20:
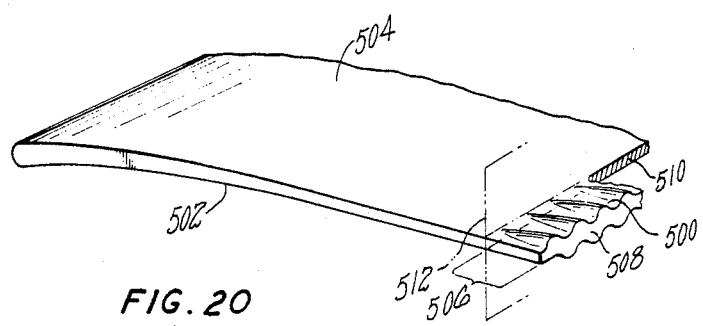
FIG. 20 is an illustrative perspective view of an airfoil showing an alternate embodiment of the present invention.
Figure 21:
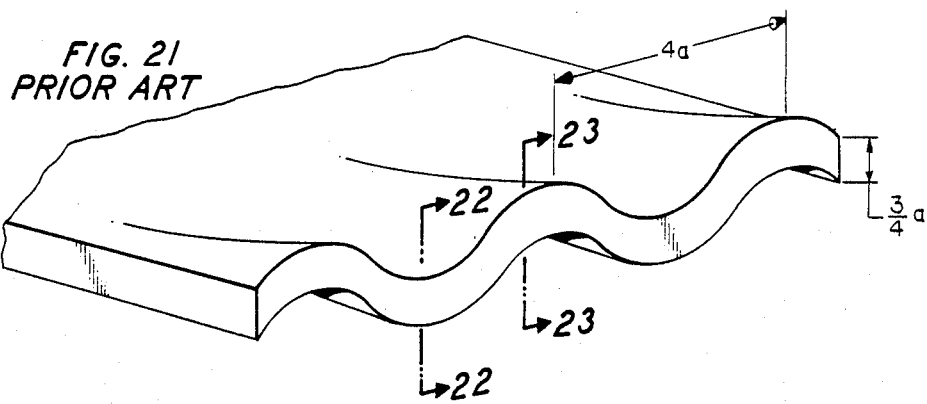
FIG. 21 is a perspective view of a "blade" in accordance with the prior art.
Figure 22:
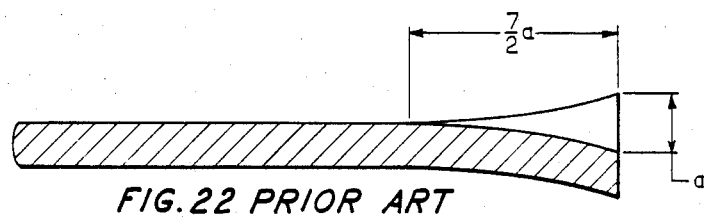
FIG. 22 is a cross sectional view taken along the line 22—22 of prior art FIG. 21.
Figure 23:
FIG. 23 is a cross sectional view taken along the line 23—23 of prior art FIG. 21.

As shown in the alternate airfoil embodiment of FIG. 20, the troughs 500 may also be formed by building up the airfoil pressure and/or suction surfaces 502, 504, respectively, in the trailing edge region 506. This actually increases the downstream projected susrface area of the blunt trailing edge 508 such that it is even greater than the area of a longitudinal cross section 510 taken upstream of the trailing edge surface along the trough inlets, such as in the plane 512 shown in phantom. The net base drag may be reduced despite this increase in blunt base area.

Although the invention has been shown and described with respect to a preferred embodiment thereof, it should be understood by those skilled in the art that other various changes and omissions in the form and detail of the invention may be made without departing from the spirit and scope thereof.

We claim:

1. An article adapted to be disposed in a fluid moving downstream relative thereto, said article having a first surface extending generally downstream, and a blunt end surface immediately downstream of an adjoining said first surface and facing generally downstream, a plurality of adjacent troughs formed in said first surface extending in an axial direction, which is the direction of the streamlines of the bulk fluid flow adjacent said surface in which said troughs are disposed, and continuing to said end surface to form a plurality of adjacent trough outlets in said end surface, each of said troughs including a pair of downstream extending sidewall surfaces which intersect said end surface to form side edges of said trough outlets, wherein a portion of the area of said blunt end surface extends laterally from each of said side edges of each of said plurality of trough outlets to the side edge of an adjacent trough outlet over the full length of each of said side edges, wherein said laterally extending area portion between each pair of adjacent trough outlets is at least one-fourth (¼) of the downstream projected area of one of said adjacent trough outlets, wherein, in cross-section perpendicular to the downstream direction, lines tangent to each sidewall of said pair of trough sidewalls at their steepest point at said trough outlet are substantially parallel, wherein each of said troughs has an inlet and gradually increases from no depth at said inlet to its maximum depth, and wherein the contour and dimensions of said troughs and the size of said laterally extending area portions of said blunt end surface are such as to ensure that each trough flows full throughout its length and causes fluid to flow into the space immediately downstream of said blunt end surface to reduce base drag.

2. The article according to claim 1 wherein said pair of sidewall surfaces of each trough are substantially parallel to the direction of bulk fluid flow over said first surface in the vicinity of said trough over a substantial continuous portion of the length of said trough, said continuous portion including said trough outlet.

3. The article according to claim 1 wherein each of said troughs is smoothly U-shaped along its length in cross section perpendicular to the downstream direction.

4. The article according to claim 3 wherein said plurality of troughs define a smoothly undulating surface which is wave-shaped in cross section perpendicular to the downstream direction.

5. The article according to claim 1 wherein the sum of said downstream projected areas of said trough outlets is no greater than about 30% of the downstream projected area of said blunt end surface.

6. The article according to claim 1 wherein each trough generates a single large-scale axial vortex from each sidewall surface, said pair of vortices from each trough rotating in opposite directions.

7. The article according to claim 1 wherein said article has a second surface extending generally downstream, and which is spaced from and faces in a substantially opposite direction and away from said first surface, said blunt end surface being disposed immediately downstream of and adjoining said second surface, a plurality of said troughs being formed in said second surface, wherein a portion of the area of said blunt end surface extends laterally from each of said side edges of said troughs in said second surface to the side edge of an adjacent trough over the full length of each of said side edges.

8. An article adapted to be disposed in a fluid moving downstream relative thereto, said article having a first surface extending generally downstream, and a blunt end surface immediately downstream of and adjoining said first surface and facing generally downstream, a plurality of adjacent troughs formed in said first surface extending in an axial direction, which is the direction of the streamlines of the bulk fluid flow adjacent said surface in which said troughs are disposed, and continuing to said end surface to form a plurality of adjacent trough outlets in said end surface, the sum of the downstream projected areas of said troughs outlets being no greater than about 30% of the downstream projected area of said blunt end surface, each of said troughs including a pair of downstream extending sidewall surfaces which intersect said end surface to form side edges of said trough outlets, wherein a portion of the area of said blunt end surface extends laterally from each of said side edges of each of said plurality of trough outlets to the side edge of an adjacent trough outlet over the full length of each of said side edges, wherein each of said troughs has an inlet and gradually increases from no depth at said inlet to its maximum depth, wherein the contour and dimensions of said troughs and the size of said laterally extending area portions of said blunt end surface are such as to ensure that each trough flows full throughout its length and causes fluid to flow into the space immediately downstream of said blunt end surface to reduce base drag.

9. The article according to claim 8 wherein said article has a second surface extending generally downstream, and which is spaced from and faces a substantially opposite direction and away from said first surface, said blunt end surface being disposed immediately downstream of and adjoining said second surface, a plurality of said troughs being formed in said second surface, wherein a portion of the area of said blunt end surface extends laterally from each of said side edges of said troughs in said second surface to the side edge of an adjacent trough over the full length of each of said side edges.

10. The article according to claim 8 wherein the portion of the downstream projected area of the blunt end surface disposed laterally between each pair of adjacent trough outlets in each of said first and second surfaces is at least one-fourth ($\frac{1}{4}$) of the downstream projected area of one of said pair of trough outlets.

11. The article according to claim 8 wherein said pair of sidewall surfaces of each trough are substantially parallel to the direction of bulk fluid flow over the surface in which said trough is disposed over a substantial continuous portion of the length of said trough, said continuous portion including said trough outlet.

12. The article according to claim 8 wherein each of said troughs is smoothly U-shaped along its length in cross section perpendicular to the downstream direction.

13. The article according to claim 12 wherein each of said plurality of troughs in each of said first and second surfaces define a smoothly undulating surface which is wave-shaped in cross section perpendicular to the downstream direction.

14. The article according to claim 8 wherein the blunt end surface is a substantially flat surface perpendicular to the downstream direction.

15. The article according to claim 8 wherein the article is a vehicle and the blunt end surface is a rear end surface of said vehicle.

16. A vehicle adapted to be disposed in a fluid moving downstream relative thereto, said vehicle having a blunt rear end surface and a first surface defining a first plurality of adjacent, downstream extending troughs, each of said troughs terminating at said rear end surface to form a plurality of spaced apart trough outlets in said end surface, each of said troughs including a pair of downstream extending sidewall surfaces which intersect said rear end surface to form side edges of said trough outlets, wherein in cross-section perpendicular to the downstream direction, lines tangent to each sidewall of each of said pair of trough sidewalls at their steepest point at said trough outlet are substantially parallel, wherein a first portion of the area of said rear end surface extends laterally from each of said side edges to the side edge of an adjacent trough outlet over the full length of each of said side edges, wherein the downstream projected area of the rear end surface disposed laterally between each pair of adjacent trough outlets of said first plurality of troughs is at least one-fourth ($\frac{1}{4}$) of the downstream projected area of one of said pair of adjacent trough outlets, wherein each of said troughs has an inlet and gradually increases from no depth at said inlet to its maximum depth, wherein the contour and dimensions of said troughs and the size of said first area portions are such as to ensure that each trough flows full throughout its length and causes fluid to flow into the space immediately downstream of said rear end surface to reduce base drag.

17. The vehicle according to claim 16 wherein said pair of sidewall surfaces of each trough of said first plurality of troughs are substantially parallel to the direction of bulk fluid flow over said first surface in the vicinity of said trough over a substantial continuous portion of the length of said trough, said continuous portion including said trough outlet.

18. The vehicle according to claim 16 wherein each of said troughs of said first plurality of troughs is smoothly U-shaped along its length in cross section perpendicular to the downstream direction.

19. The vehicle according to claim 18 wherein said first plurality of troughs define a smoothly undulating surface which is wave-shaped in cross section perpendicular to the downstream direction.

20. The vehicle according to claim 16 wherein the sum of said downstream projected areas of all of said trough outlets is no greater than about 30% of the downstream projected area of said rear end surface.

21. The vehicle according to claim 16 wherein said vehicle has a second surface spaced from and facing in a direction substantially opposite to and away from said first surface and defining a second plurality of said downstream extending troughs.

22. The vehicle according to claim 21 wherein the portion of the downstream projected area of said rear end surface disposed laterally between each pair of adjacent trough outlets of said second plurality of troughs is at least one-fourth (¼) of the downstream projected area of one of said pair of trough outlets.

23. The vehicle according to claim 22 wherein each of said first and second plurality of troughs defines a smoothly undulating surface which is wave-shaped in cross section perpendicular to the downstream direction.

24. The vehicle according to claim 21 wherein each of said troughs of said first and second plurality of troughs is smoothly U-shaped along its length in cross section perpendicular to the downstream direction.

25. The vehicle according to claim 21 wherein the sum of said downstream projected areas of all of said trough outlets is no greater than about 30% of the downstream projected area of said rear end surface.

26. The vehicle according to claim 21 wherein said pair of sidewall surfaces of each trough are substantially parallel to the direction of bulk fluid flow over the surface in which said trough is disposed over a substantial continuous portion of the length of said trough, said continuous portion including said trough outlet.

27. The vehicle according to claim 16 wherein said rear end surface is a substantially flat surface perpendicular to the downstream direction.

28. The vehicle according to claim 16 wherein each trough generates a single large-scale vortex from each sidewall surface, each of said vortices having and axis extending downstream, said pair of vortices from each trough rotating in opposite directions.

29. A vehicle adapted to be disposed in a fluid moving downstream relative thereto, said vehicle having a blunt rear end surface and a first surface defining a first plurality of adjacent, downstream extending troughs, each of said troughs terminating at said rear end surface to form a plurality of spaced apart trough outlets in said end surface, the sum of the downstream projected areas of all of said trough outlets being no greater than about 30% of the downstream projected area of said rear end surface, each of said troughs including a pair of downstream extending sidewall surfaces which intersect said rear end surfaces to form side edges of said trough outlets, wherein a first portion of the area of said rear end surface extends laterally from each of said side edges to the side edge of an adjacent trough outlet over the full length of each of said side edges, wherein each of said troughs has an inlet and gradually increases from no depth at said inlet to its maximum depth, wherein the contour and dimensions of said troughs and the size of said first area portions are such as to ensure that each trough flows full throughout its length and causes fluid to flow into the space immediately downstream of said rear end surface to reduce base drag.

30. The vehicle according to claim 29 wherein said pair of sidewall surfaces of each trough of said first plurality of troughs are substantially parallel to the direction of bulk fluid flow over said first surface in the vicinity of said trough over a substantial continuous portion of the length of said trough, said continuous portion including said trough outlet.

31. The vehicle according to claim 29 wherein each of said troughs of said first plurality of troughs is smoothly U-shaped along its length in cross section perpendicular to the downstream direction.

32. The vehicle according to claim 31 wherein said first plurality of troughs define a smoothly undulating surface which is wave-shaped in cross section perpendicular to the downstream direction.

33. The vehicle according to claim 29 wherein said vehicle has a second surface spaced from and facing in a direction substantially opposite to and away from said first surface and defining a second plurality of said downstream extending troughs.

34. The vehicle according to claim 33 wherein each of said first and second plurality of troughs defines a smoothly undulating surface which is wave-shaped in cross section perpendicular to the downstream direction.

35. The vehicle according to claim 33 wherein each of said troughs of said first and second plurality of troughs is smoothly U-shaped along its length in cross section perpendicular to the downstream direction.

36. The vehicle according to claim 33 wherein said pair of sidewall surfaces of each trough are substantially parallel to the direction of bulk fluid flow over the surface in which said trough is disposed over a substantial continuous portion of the length of said trough, said continuous portion including said trough outlet.

37. The vehicle according to claim 29 wherein said rear end surface is a substantially flat surface perpendicular to the downstream direction.

38. The vehicle according to claim 29 wherein each trough generates a single large-scale vortex from each sidewall surface, each of said vortices having an axis extending downstream, said pair of vortices from each trough rotating in opposite directions.

* * * * *